UNITED STATES PATENT OFFICE.

WILLIAM McMURTRIE, OF OXFORD TOWNSHIP, WARREN COUNTY, N. J.

IMPROVEMENT IN BATING COMPOUNDS FOR HIDES OR SKINS.

Specification forming part of Letters Patent No. 197,739, dated December 4, 1877; application filed November 23, 1877.

*To all whom it may concern:*

Be it known that I, WILLIAM MCMURTRIE, of the township of Oxford, in the county of Warren and State of New Jersey, have invented a new and useful compound, to be used in that portion of the process of preparation of skins for tanning known as "bating," which compound is fully described and set forth in the following specification.

The object of this invention is to form a compound which, when complete, may be in condition convenient for packing, storage, and transportation, and always ready for use in any quantity. This object is accomplished by thoroughly incorporating with dry pulverized glucose, or its equivalent, a suitable proportion, about ten per cent., of dried sour cheese or its equivalent, forming a compound which may be packed, transported, and stored without danger of deterioration, and which, when added to the vats containing the skins impregnated with lime, will undergo molecular transformation with production of lactic acid. The acid thus formed, combining with the lime, makes a soluble compound, which may be removed by washing with water, or the ordinary treatment of the skins.

Instead of glucose, I may substitute starch, dextrine, cane-sugar, or other amylaceous or saccharine substances suitable for making a portable compound; and for cheese, gluten in any form, or albumen, from whatever source it may be obtained in a dry condition, may be used. These have, however, the disadvantage of being either more costly or of being more tardy in their action, and glucose and cheese are therefore preferable. In case of either of these substances being used, the compound formed should be well dried before packing.

What I claim, and desire to secure by Letters Patent, is—

The bating compound consisting of dry glucose and dried sour cheese, or their equivalents, thoroughly incorporated with each other, in the condition and for the purposes substantially as described.

WM. McMURTRIE.

Witnesses:
R. L. PACKARD,
THOMAS C. CONNOLLY.